Sept. 19, 1967  B. EDWARDS  3,342,914
METHOD AND APPARATUS FOR DEEP DRAW MOLDING
Filed July 13, 1964  3 Sheets-Sheet 1

INVENTOR.
Bryant Edwards
BY *Robert W. Beart*
His Att'y

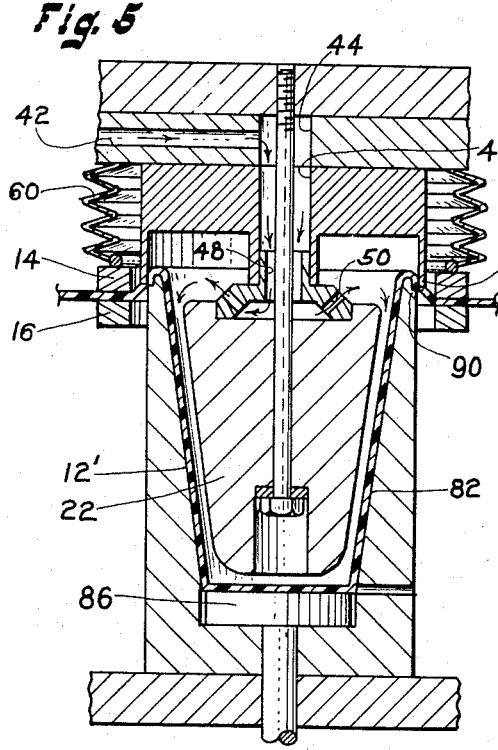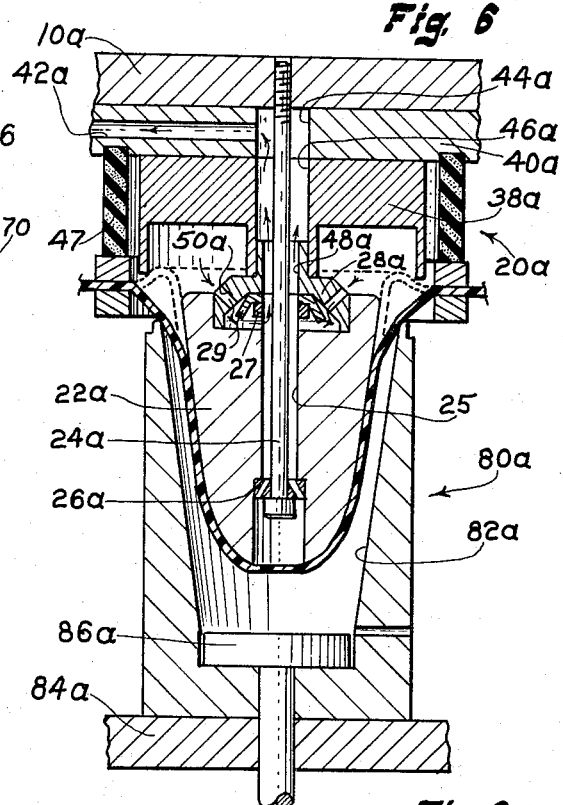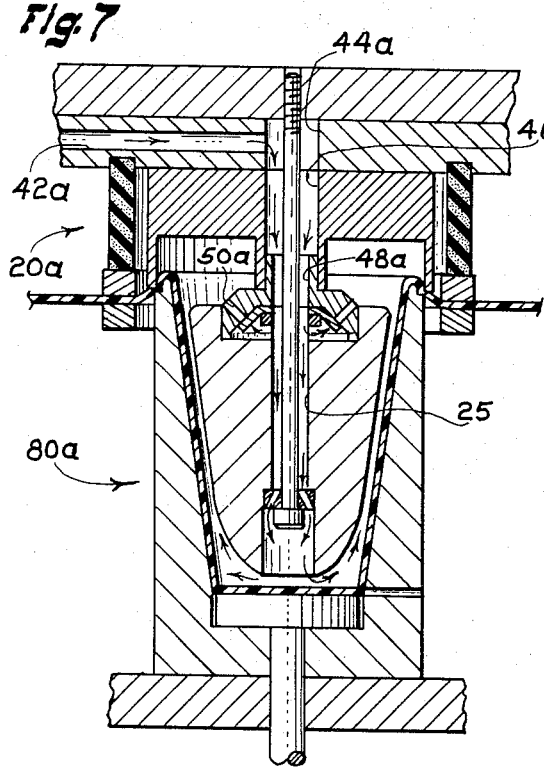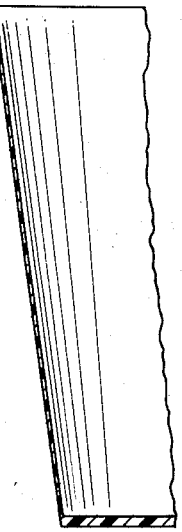

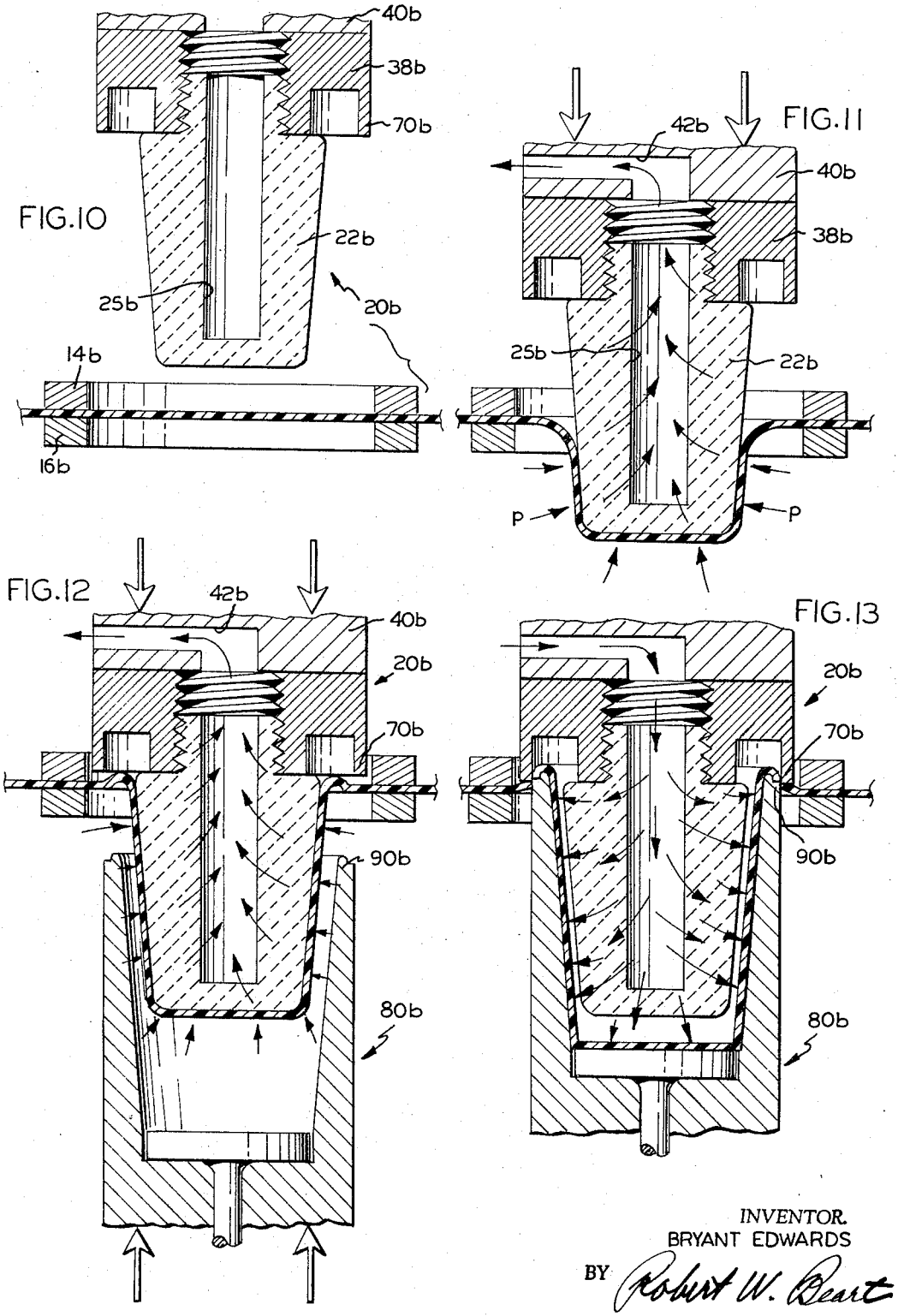

United States Patent Office 3,342,914
Patented Sept. 19, 1967

3,342,914
METHOD AND APPARATUS FOR DEEP DRAW MOLDING
Bryant Edwards, Clarendon Hills, Ill., assignor to Illinois Tool Works Inc., Chicago, Ill., a corporation of Delaware
Filed July 13, 1964, Ser. No. 382,081
8 Claims. (Cl. 264—89)

The present invention relates to a method and apparatus for forming hollow articles such as containers, and more particularly, to a method and apparatus for producing relatively deep thin-wall thermoplastic containers of the disposable variety.

In general, two basic methods have been used to form containers from thermoplastic material, one being the technique of injection molding, and the other based upon thermoforming principles. It has been found that injection molded containers cannot be made as thin-walled as the formed variety, for example, a 16 ounce capacity unit uses almost double the amount of material (28 grams) as the thermoformed types (15 grams). In addition, injection molded containers cannot be produced at the speeds possible with thermoformed containers, unless the molder installs a substantial battery of small injection molding machines, and is ready to invest heavily in the necessary tooling. Where it is desired to produce containers having a 32 ounce capacity, the advantage of using the thermoforming technique become even more apparent.

Several variations of the thermoforming concept have been developed, including the plug assist method, the vaccum or pressure technique without any mechanical engagement with the thermoplastic material, and a combination of the plug assist and either the vacuum or pressure forming techniques. In achieving relatively deep draws such as would be necessary for a container of a 16 ounce capacity, it has been found that a combination of the plug assist and pressure forming techniques have been highly satisfactory in providing a relatively uniform wall thickness which is important not only from the strength standpoint, but also for the appearance of the container. A typical plug assist and pressure forming operation would be performed by clamping a web of heated thermoplastic material such as polystyrene, engaging the web with a mandrel to draw predetermined areas downwardly away from the clamped web into a mold cavity, and then creating a pressure differential on opposite sides of the web to expand the mechanically drawn areas into engagement with the cavity of the female mold.

Certain problems have arisen with this last mentioned thermoforming technique in the forming of 32 ounce containers where it is necessary to have extremely deep draws. The plastic tends to cling to the bottom of the mandrel during the preforming operation resulting in containers having a thick bottom. During the preforming operation, there has also been some difficulty in material slippage on the sides of the mandrel creating container side walls which are undesirably thin from a strength and appearance standpoint. An additional complicating factor is that the shape of the preformed areas of the web approximates that of the finished articles, causing a premature engagement of the material near the top of the mold cavity, and this results in thick improperly formed sections near the top of the container.

Accordingly, it is an object of the present invention to overcome the disadvantages in forming thin-walled containers, especially those of large volume capacities.

Another object of the present invention is the provision of a method and apparatus for improving the material distribution in thin-walled containers.

More specifically, it is an object of the present invention to eliminate any tendency of mechanically drawn material to cling to the bottom of a mandrel or plug and provide a container having a non-thickened bottom wall.

Still another object of the present invention is the provision of a novel method and apparatus which eliminates slippage of the material during a preforming operation so as to improve the material distribution of the container side wall relative to the other container structure.

A still further object of the present invention is the provision of a novel method and apparatus which prevents premature contact with the cavity of a female mold to improve material distribution in an upper body section of the container.

Yet still another object of the present invention is to provide a method and apparatus of the aforenoted type which can produce both shallow and deep drawn containers of uniform wall thickness and material distribution, and at exceedingly high production capacities without increasing the unit cost per container.

Other and further objects and advantages of the present invention will become apparent from the following description when taken in connection with the accompanying drawings wherein:

FIG. 5 is a view similar to FIG. 4, and showing the relative movement of the lower mold means to trim the formed container from the remainder of the web; and FIGS. 6–7 are semi-diagrammatic sectional views of still another embodiment coming within the purview of the present invention.

FIG. 8 is a partial sectional view of a container formed by prior art methods and apparatus;

FIG. 9 is a partial sectional view of a container formed in accordance with the teachings of the present invention; and FIGS. 10–13 are semi-diagrammatic sectional views of another form of upper mold means as it proceeds through its sequential movements in cooperation with the lower mold means to form a thin-walled container.

Figure 1:
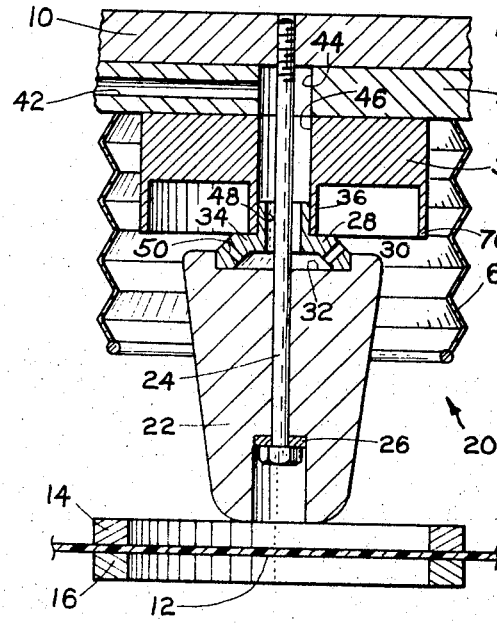
FIG. 1 is a semi-diagrammatic sectional view of one form of upper mold means constructed in accordance with the principles of the present invention, and prior to engagement with a web of thermoplastic material.

Before discussing the present method and apparatus, it will be observed that only semi-diagrammatic sectional views of the upper and lower molds have been shown in the drawings to highlight the features which are characteristic of the present invention. It will be understood that conventional means may be employed to reciprocate the mold members, establish a vacuum on pressure, etc. such as shown, for example, in my prior U.S. Patent 3,121,916 dated Feb. 25, 1964.

Referring now in greater detail to the drawings, and in particular to the form of the invention shown in FIGS. 1–5 of the drawings, there is disclosed a novel method and apparatus for forming relatively deep thin-walled containers using the thermoforming technique. As is usual with thermoforming apparatus, there is provided an upper mold means 20 having a mandrel 22 which cooperates with a lower mold means in the form of a female mold 80 having a cavity 82 generally complementary in shape to the mandrel.

To facilitate an understanding of the manner in which the upper and lower mold means cooperate with one another to form a container, it is believed that a brief discussion of one thermoforming technique using the plug assist and pressure forming method would be most helpful. A typical operation would begin by continuously supplying a sheet of thermoplastic material, such as polystyrene, from an extruding mechanism, and intermittently advancing the same past a heating station at which the sheet is heated and softened to a desired degree. The heated thermoplastic sheet is then advanced to a forming station having one or more molds and complementary mandrels. At this station, the thermoplastic sheet is preferably clamped on opposite sides thereof intermediate of and out of contact with cooperating mold and mandrel means so as to prevent premature localized cooling of the sheet. After the sheet has been clamped, the molds and mandrels are relatively advanced toward each other in order to mechanically draw predetermined areas from the thermoplastic sheet and into the cavity of the mold. A positive air pressure is then forced through holes, usually near the top of the mandrel, to expand the predetermined drawn areas of the sheet and position them against the inner periphery of the female mold. Once this has been accomplished, the container so formed may be severed from the remainder of the thermoplastic sheet either by complementary cutting means associated with the upper and lower mold means, or at a separate trimming station. Most of the difficulty which has arisen in the past has centered around the fact that the preformed material tends to cling to the bottom and sides of the mandrel, and causes premature engagement with the inner periphery of the female mold, resulting in a container having a thick bottom wall and upper body sections with undesirably thin side walls such as shown in FIG. 8. The present invention overcomes these difficulties as will subsequently appear to provide a container of uniform wall thickness as illustrated in FIG. 9.

As shown in FIG. 1 of the drawings, a bolt or fastener element 24 passes through a washer 26 and secures the mandrel 22 to the upper platen 10, which also serves as a cooling plate. Bolt 24 also extends through adapter 28 which is provided with an annular depending element 30 for reception within a recess 32 formed in the upper body portion of the mandrel 22. Extending from the adapter 28 in a direction opposite to the annular depending element 30 is a boss element 34 which is adapted to be accepted by a circular flange 36 of the upper mold block 38. Intermediate the upper mold block 38 and the upper platen 10 is an air manifold plate 40 having an air passageway 42 which cooperates with the recesses or channels 44, 46 and 48 formed in the air manifold plate 40, upper mold block 38, and adapter 28 respectively so as to permit air or other fluid pressure to be vented or exhausted through the ports 50 in the adapter.

The lower mold means 80 is in the form of a female mold having a cavity 82 of a size generally larger than that of the mandrel, and which is mounted on the supporting plate 84 of the lower platen. An ejector or knock out plug 86 is positioned adjacent the lower wall of the cavity 82, and is adapted to force the completed container out of the female mold after the forming operation. A channel 88 leading from the interior of the mold is provided to exhaust air between the partially formed container and the female mold cavity to prevent any build up of a resilient back pressure.

Figure 2:
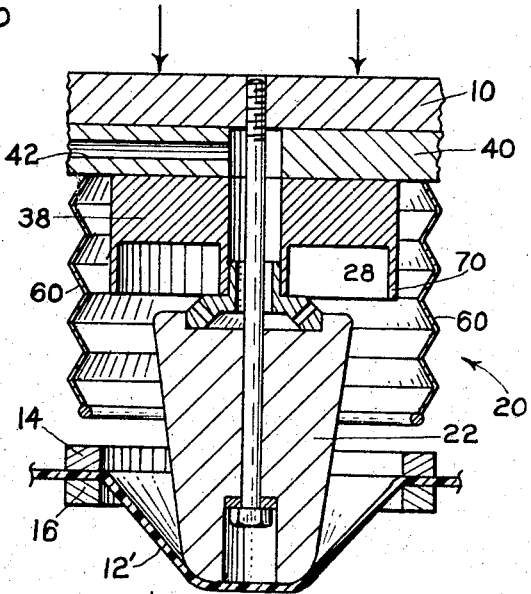
FIG. 2 is a view similar to FIG. 1, and showing the upper mold means as it moves into engagement with the web of thermoplastic material.
Figure 4:
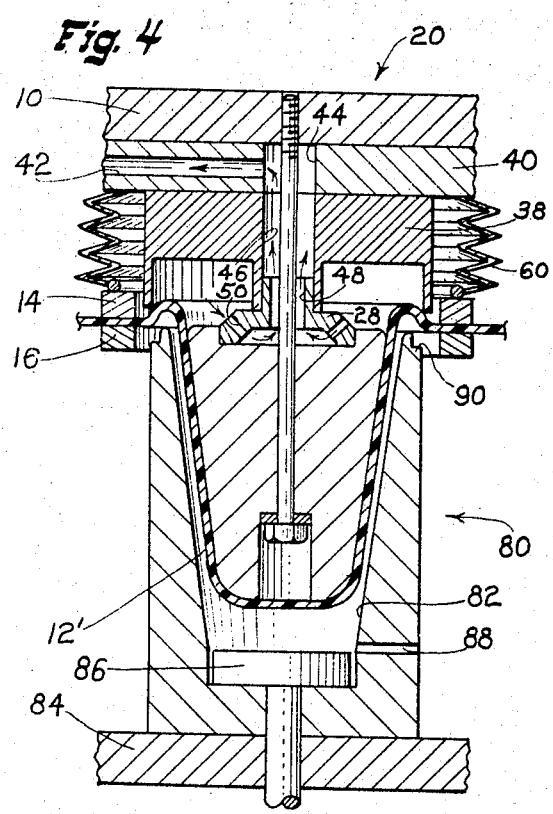
FIG. 4 is a semi-diagrammatic sectional view of co-operating upper and lower mold means, and indicating the manner in which the upper mold means forces a discrete area of the thermoplastic web within the cavity of the lower mold means.
Figure 3:
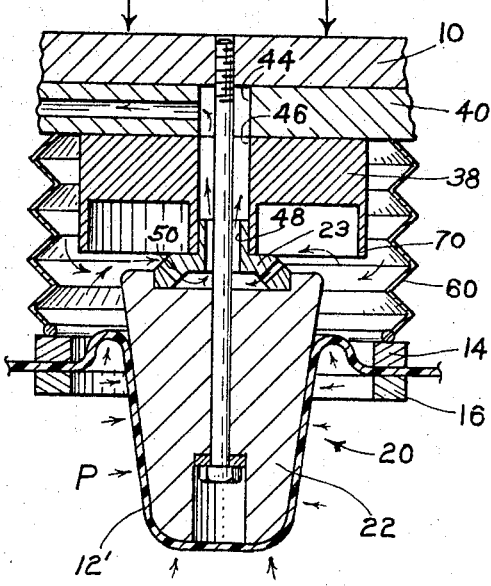
FIG. 3 is a view similar to FIGS. 1–2 illustrating further movement of the upper mold means against the material.

Just prior to the relative shifting of the mandrel and female mold toward each other, the thermoplastic web 12 is clamped by upper and lower annular clamping rings 14, 16 in a circumferential manner outside the mandrel and mold periphery as shown in FIG. 1 of the drawings. The upper and lower clamping rings 14, 16 are shown only diagrammatically here, but are specifically shown and described in U.S. Patent No. 2,962,758 dated Dec. 6, 1960, to Charles J. Politis. After the web is clamped, the mandrel and mold are relatively shifted toward one another as indicated by the arrows in FIG. 2 by any suitable means to cause engagement of the mandrel 22 with the thermoplastic sheet for drawing predetermined areas 12' from the remainder of the web or sheet. Further advance of the mold means toward each other enlarges the predetermined drawn areas 12' as shown in FIG. 3, and forces these areas within the cavity 82 of the female mold as shown in FIG. 4.

It has been found that slippage of the material on the mandrel and premature contact of the material with the mold during the preforming operation can be avoided by positioning the predrawn areas 12' of the sheet into close conforming, non-shifting relationship with the mandrel. This is preferably accomplished by providing a rubber bellows 60 which is secured to the upper die block 40 and extends downwardly so as to encompass an upper body portion of the mandrel 22 as seen in FIG. 1. When the upper mold means is advanced downwardly and into engagement with the thermoplastic web, the rubber bellows 60 will be moved toward the upper annular clamping ring 14 as seen in FIG. 2, and finally positioned into engagement therewith as seen in FIG. 3 for sealing the upper surface of the predetermined drawn areas 12' from the lower surface thereof and the remainder of the web. If air trapped within the area encompassed by the rubber bellows is evacuated so as to create a vacuum, atmospheric pressure indicated by the arrows identified P in FIG. 3 will force the predetermined drawn areas 12' of the web into close conforming relationship with the mandrel.

Preferably, the air is evacuated from this area by a suitable means connected to the air passageway 42 to draw the air through the ports 50 of the adapter, and then through the channels 48, 46 and 44 to cause it to be drawn through the air passageway 42. A suitable valving and control arrangement can withdraw the trapped air at a time when the rubber bellows engages the upper annular ring 14; however, it is preferable to begin the evacuation of the air when the mandrel starts its downward advance to insure that the predetermined drawn areas 12' will begin to conform to the shape of the mandrel, and will be positioned in abutting relationship thereto just after the rubber bellows 60 engages the upper annular clamping ring 14.

It is to be noted that this arrangement will not only position the predetermined drawn areas 12' into close conforming relationship with the mandrel 22, but will also cause an area of the web intermediate the mandrel and clamping rings to bulge upward above the plane of the web. This effect is best seen in FIG. 3. As a result, there will be no tendency for the material to slip on the sides of the mandrel, and because the area of the web intermediate the clamping rings and plugs is spaced upwardly from the web, the possibility of premature engagement of the web with the female mold is quite remote.

It is desirable that the predetermined drawn areas 12' be held in this manner only during the preforming operation or when the material is mechanically engaged by the mandrel since it has been found that relatively deep drawn containers can best be formed by a combination of a mechanical engagement and pressure forming action on the area of the web to be stretched. Thus, as soon as the mandrel 22 has positioned the predetermined drawn areas 12' a desired distance within the cavity 82 of the female mold, the vacuum will be released and a positive air pressure applied through the air passageway 42, the channels 44, 46 and 48, and out through the ports 50 of the adapter for expanding the predetermined drawn areas 12' received within the female mold cavity by forcing these areas into engagement with the inner periphery of the female mold to form the desired container configuration. A comparison of FIGS. 4–5 will reveal the change over from a vacuum to a positive air pressure in the final stages of the forming operation.

After a designated time period permitting the plastic within the female mold to chill to desired extent, the female mold may then be advanced upwardly a short distance, as indicated by the arrows in FIG. 5, to position the complementary annular cutting rings 70, 90 on the upper and lower mold means respectively in overlapping relationship for severing the formed container from the remainder of the web. Thereafter, the upper and lower molds will be retracted and the ejector 86 will be actuated by a suitable means to push the formed container out of the female mold. Alternately, the formed container may be ejected from the mold while still attached to the web, and severed therefrom at a separate trimming station.

As will now be apparent, the completely formed container shown in section in FIG. 9 of the drawings, will have a uniform side wall thickness and upper body section. In using the method and apparatus just described, however, there still is a possibility that a relatively thick bottom container wall will be formed since the positioning of the predetermined drawn area 12' into close conforming relationship with the mandrel will cause the material to cling to the bottom of the mandrel during the preforming operation, resulting in a relatively thick container bottom as exemplified by the poorly formed container in FIG. 8 of the drawings. This difficulty can be alleviated by the embodiments of the apparatus shown in FIGS. 6–7 or 10–13 of the drawings.

The FIGS. 6–7 apparatus is generally similar to the FIGS. 1–5 embodiment as indicated by the application of identical reference numerals with the suffix "a" employed to designate like parts. The operation of the apparatus shown in FIGS. 6–7 is generally similar to the FIGS. 1–5 embodiment, and for that reason, the sequences showing the establishment of the vacuum and the positive pressure have been shown only.

The mandrel 22a of the FIGS. 6–7 embodiment is attached to the upper platen by a bolt or other suitable fastening element 24a passing through a washer 26a as previously described. However, in this case, the recess 25 in the mandrel through which the bolt passes is enlarged to substantially the same extent as the channel 48a of the adapter 28a. In addition, the washer 26a is slotted so as to permit the ingress and egress of air through the passageway 25. A slotted washer 27 is also used to position the flexible washer 29 in close proximity to the undersurface of the adapter 28a. The flexible washer 29 is designated to cover the ports 50a of the adapter during certain portions of the forming cycle. With this arrangement, when vacuum is applied through the air passageway 42a and the communicating channels 44a–48a, the flexible washer 29 moves away from the ports 50a as soon as the mandrel touches the thermoplastic sheet and blocks the entry of air from its bottom. When the air pressure is reversed, and a positive air pressure is established through the air passageway 42a of the air manifold plate 40a, the rubber washer 29 will close the ports 50a, as seen in FIG. 7, causing the air pressure to enter through the mandrel passageway 25 beyond the slotted washer 26a and the bottom of the mandrel.

If a mandrel having the shape shown in FIGS. 1–5 is used, there will still be a tendency for a portion of the predetermined drawn areas 12' of the web to cling to the bottom of the mandrel. It is to be noted, however, that a parabolically shaped mandrel 20a may be provided, which eliminates, to a great extent, a large bottom area for the mandrel. This, together with the fact that air is introduced through the passageway 25 of the mandrel and out its bottom portion, for initially expanding the lower portions of the predetermined drawn areas 12' against the inner periphery of the female mold will, to a large extent, offset any tendency of the material to cling to the bottom of the mandrel.

In instances where the container side wall thickness is not too critical, a rubber ring 47 having a length slightly less than that of the upper mold block 38a may be used so that the vacuum will not have any effect until the rubber ring 47 contacts the upper annular clamping ring 12a. This will reduce the tendency of the material to cling to the bottom portion of the mandrel, but would tend to cause slippage of the material on the sides of the mandrel.

The embodiment of the invention shown in FIGS. 10–13 is generally similar to the other embodiments as indicated by the application of identical reference numerals with the suffix "b" employed to designate like parts. The essential difference between this and the other embodiments is that the mandrel 22b of the upper mold means is made of porous construction, and this can be accomplished by either forming or otherwise creating holes in the mandrel, or by using a mandrel, such as sintered bronze, to provide a porous structure. The mandrel 22b is preferably threaded at its upper end for cooperation with the internally threaded bore of the upper mold block 38b. A longitudinally extending recess 25b formed in the mandrel communicates with the bore of the upper mold block 38b and the air passageway 42b of the air manifold plate 40b to permit the ingress and egress of air.

Thus, on the downward advance of mandrel 22b as shown in FIG. 11, air is withdrawn through the porous openings of the mandrel 22b through the recess 25b and out the air passageway 42b to establish a vacuum within the partially formed container. Atmospheric pressure, indicated by the arrows P, will hold the predetermined drawn areas of the material in close conforming relationship to the mandrel so as to increase the frictional force between the mandrel and the sheet to prevent material slippage. The tendency of the material to slip along the mandrel when using the thermoforming technique becomes more pronounced as the tension in the sheet increases, and this is caused by increasing the depth of the draws. Reducing this slippage has desirable effects as has heretofore been discussed.

In certain cases, it may be desirable to permit a predetermined amount of slippage in a particular area of the sheet during the mechanical drawing stage. When using the porous mandrel approach, this may be accomplished by suitably masking off certain areas of the mandrel. For example, where a sintered bronze mandrel is used, the end of the mandrel may be polished so as to close the pores therein, thus allowing some slippage of the sheet during its mechanical drawing phase. As has been noted, this will have the effect of preventing thick bottom sections in the container.

FIGS. 12 and 13 show the relative movement of the upper and lower mold means during the final stages of the molding operation. In FIG. 12, the material is still shown as being maintained to the shape of the mandrel by the differential in air pressure. The air flow is reversed after the mandrel completes its advance, and a positive air pressure is introduced through the porous mandrel and against the partially formed container to expand it against the inner periphery of the lower mold means 80b. Thereafter, the container may be severed from the remainder of the web by the complementary cutting means 70b, 90b associated with the upper and lower mold means, or alternatively, the container may be severed from the web at a separate trimming station.

It is to be noted that the mandrel shown in FIGS. 10–13 tapers upwardly and outwardly from its bottom portion, but that the longitudinally extending recess 25b extends in a substantially vertical plane. The effect of this results in an increase of air flow impedance as the plug diameter increases to obtain a more uniform pressure drop. In other words, the entire area of the partially formed container is subject to substantially uniform pressure due to the relationship of the recess and the tapered exterior of the mandrel.

From the foregoing, it will now be appreciated that the method and apparatus of the present invention will form relatively deep thin-walled plastic containers from a web of heated thermoplastic material having uniform material distribution throughout its bottom, side and upper body portions. The significance of the present method and apparatus becomes apparent when comparing the sectioned containers shown in FIGS. 8–9 of the drawings. Extreme differences in wall thickness were noted in containers of the 32 ounce capacity formed in accordance with prior art methods and apparatus as indicated by the exaggerated structural deformities in FIG. 8 of the drawings but by forming a 32 ounce container in accordance with the concepts underlying the present invention, it has been found that the material distribution reaches an acceptable level throughout the entire extent of the container body as illustrated in FIG. 9.

Although specific embodiments have been shown and described, it is with full awareness that many modifications thereof are possible. The invention is not to be restricted except insofar as is necessitated by the prior art and by the spirit of the appended claims.

I claim:
1. The method of forming relatively deep thin-wall containers from a sheet of heated thermoplastic material comprising:
   (a) supporting the heated thermoplastic sheet in alignment with and between a cooperating mandrel and female mold,
   (b) clamping opposite sides of the sheet in a circumferential manner outside the mandrel and mold periphery,
   (c) relatively moving the mandrel and female mold toward each other to mechanically draw predetermined areas from the thermoplastic sheet,
   (d) sealing off the clamped and drawn areas from the remainder of the thermoplastic sheet during the relative closing movement of the mandrel and female mold,
   (e) establishing a vacuum through the mandrel for maintaining the predetermined drawn areas sealed off from the remainder of the sheet in close conforming relationship to the mandrel during the preforming operation,
   (f) releasing the vacuum when the mandrel and female mold have completed their movement toward each other,
   (g) introducing a positive fluid pressure through the mandrel within the predetermined drawn areas to expand them against the inner periphery of the female mold and form the final container shape, and
   (h) severing the container from the sheet while the same is in deforming position.

2. The method of forming relatively deep thin-wall containers from a sheet of heated thermoplastic material comprising:
   (a) supporting the heated thermoplastic sheet in alignment with and between a cooperating mandrel and female mold of predetermined different size and configuration,
   (b) clamping opposite sides of the sheet in a circumferential manner outside the mandrel and mold periphery,
   (c) relatively moving the mandrel and female mold for a portion of their movement toward each other to mechanically draw predetermined areas from the thermoplastic sheet,
   (d) establishing a vacuum through the mandrel and sealing off the predetermined drawn areas from the remainder of the thermoplastic sheet for maintaining the predetermined drawn areas of the sheet in close conforming relationship to the mandrel during the preforming operation,
   (e) releasing the vacuum when the mandrel and female mold have completed their relative movement toward each other,
   (f) introducing a fluid pressure through a longitudinally extending recess of the mandrel and within the predetermined drawn areas of the thermoplastic sheet to expand them against the inner periphery of the female mold and form the final container shape, and
   (g) severing the container from the sheet while the same is in deforming position.

3. Apparatus for forming relatively deep thin-wall containers from a sheet of heated thermoplastic material comprising, a mold having a cavity, a mandrel disposed opposite to said mold and being of predetermined smaller size than the cavity of the mold, said mold and mandrel being of predetermined different size and configuration and adapted to be positioned on opposite sides of the heated sheet of thermoplastic material, means for actuating the mandrel to draw predetermined areas of the thermoplastic sheet into the mold cavity and provide a partially formed container, means withdrawing air from and in the vicinity of the partially formed container, means for sealing off the predetermined drawn areas from the remainder of the sheet to establish a vacuum within the partially formed container and cause it to conform to the shape of the mandrel, means for releasing the vacuum at the end of the mandrel advance and for introducing a positive fluid pressure through a longitudinally extending passageway formed in said mandrel and within the predetermined drawn areas to expand them against the inner periphery of the female moled to form the desired container configuration, and means for thereafter severing the container so formed from the remainder of the thermoplastic sheet.

4. Apparatus for forming relatively deep thin-wall containers from a sheet of heated thermoplastic material comprising a mold having a cavity, a mandrel disposed opposite to said mold and being of predetermined smaller size than the cavity of the mold, an adapter mounted on said mandrel and having a plurality of ports for the ingress and egress of air, means for actuating said mandrel to draw predetermined areas from the thermoplastic sheet and provide a partially formed container, means withdrawing air from and in the vicinity of the partially formed container and through said ports, means for sealing off the partially formed container from the remainder of the sheet during the mandrel advance to establish a vacuum within the partially formed container and cause it to conform to the shape of the mandrel, means for releasing the vacuum at the end of the mandrel advance and for introducing a fluid pressure within the partially formed container to expand it against the cavity of the female mold, and means for thereafter severing the container so formed from the remainder of the thermoplastic sheet.

5. Apparatus for forming relatively deep thin-wall containers of substantially uniform wall thickness from a sheet of heated thermoplastic material comprising, a frame, cooperating mandrel and mold means supported by said frame on opposite sides of the thermoplastic sheet, sealing means extending from said frame and surrounding an upper portion of said mandrel, means for clamping the thermoplastic sheet intermediate of and in a circumferential manner outside the mandrel and female mold periphery, means for relatively shifting said mandrel and female mold toward each other to mechanically draw predetermined areas from the sheet, the sealing means cooperating with the clamping means during the relative movement of the mandrel and female mold to seal the predetermined drawn areas from the remainder of the sheet, means withdrawing air from the predetermined drawn areas during the preforming operation to position the same in close conforming relationship to the mandrel, means for releasing the vacuum at the end of said preforming operation and for introducing a positive fluid pressure within the predetermined drawn areas of the sheet to expand them against the inner periphery of the female mold and complete the formation of the container, and means for thereafter severing the container from the remainder of the thermoplastic sheet.

6. The apparatus defined in claim 5 wherein said sealing means comprises a flexible bellows adapted to be compressed between the frame and clamping means during the preforming operation.

7. The apparatus defined in claim 5 wherein said means for severing the container from the remainder of the thermoplastic sheet comprises complementary cutting means associated with the mandrel and female mold for separating the container from the thermoplastic sheet while the same is in deforming position.

8. Apparatus for forming relatively deep thin-wall containers of substantially uniform wall thickness from a heated sheet of thermoplastic material, comprising a mold having a frusto-conically shaped cavity, a mandrel of substantially parabolic configuration disposed opposite to said mold and being of a predetermined smaller size than the mold cavity, said mandrel having a longitudinally extending passageway formed therein, an adapter mounted on said mandrel having a recess communicating with the longitudinally extending passageway of the mandrel and being provided with a plurality of ports for the ingress and egress of air, a flexible washer secured to the adapter normally closing the ports, means for actuating said mandrel to draw predetermined areas of the thermoplastic sheet within the mold cavity and provide a partially formed container, means drawing air through the adapter recess to deflect the flexible washer away from the ports and permit air to be withdrawn from and in the vicinity of the partially formed container, means for sealing the partially formed container from the remainder of the thermoplastic sheet during the advance of the mandrel to cause the partially formed container to be positioned in close conforming relationship to the mandrel, means releasing the vacuum at the end of the mandrel advance and for introducing a positive fluid pressure through the adapter recess to position the flexible washer aaginst the ports and for forcing air through the longitudinally extending passageway of the mandrel to cause the partially formed container to be expanded against the mold cavity and form the desired container configuration, and means for thereafter severing the container so formed from the remainder of the thermoplastic sheet.

References Cited
UNITED STATES PATENTS

| | | | |
|---|---|---|---|
| 2,891,280 | 6/1959 | Politis | 264—297 X |
| 2,953,814 | 9/1960 | Mumford | 264—297 X |
| 2,990,581 | 7/1961 | Rowe | 264—92 X |
| 3,167,104 | 1/1965 | Wiley et al. | |
| 3,268,952 | 8/1966 | Shelby. | |
| 3,291,874 | 12/1966 | Negoro | 264—89 |

ROBERT F. WHITE, *Primary Examiner.*

A. R. NOË, *Assistant Examiner.*